US010371322B2

(12) United States Patent
Barnes

(10) Patent No.: US 10,371,322 B2
(45) Date of Patent: Aug. 6, 2019

(54) PRESSURIZED GAS VESSEL PORT ASSEMBLY

(71) Applicant: Jim Barnes, Hutchinson, KS (US)

(72) Inventor: Jim Barnes, Hutchinson, KS (US)

( * ) Notice: Subject to any disclaimer, the term of this patent is extended or adjusted under 35 U.S.C. 154(b) by 43 days.

(21) Appl. No.: 15/604,458

(22) Filed: May 24, 2017

(65) Prior Publication Data

US 2017/0254428 A1 Sep. 7, 2017

(51) Int. Cl.

*F16K 17/00* (2006.01)
*F17C 13/12* (2006.01)
*F17C 1/00* (2006.01)
*F17C 13/04* (2006.01)

(52) U.S. Cl.

CPC ................ *F17C 13/12* (2013.01); *F17C 1/00* (2013.01); *F17C 13/04* (2013.01); *F17C 2201/0109* (2013.01); *F17C 2201/032* (2013.01); *F17C 2201/058* (2013.01); *F17C 2203/0617* (2013.01); *F17C 2205/035* (2013.01); *F17C 2205/0323* (2013.01); *F17C 2205/0391* (2013.01); *F17C 2221/011* (2013.01); *F17C 2221/018* (2013.01); *F17C 2223/0123* (2013.01); *F17C 2223/035* (2013.01); *F17C 2260/042* (2013.01); *F17C 2270/0545* (2013.01); *Y10T 137/7727* (2015.04)

(58) Field of Classification Search

CPC .. F17C 13/12; F17C 1/00; F17C 13/04; F17C 2260/042; F17C 2205/0323
USPC ............................. 137/487, 459, 515.5, 460
See application file for complete search history.

(56) References Cited

U.S. PATENT DOCUMENTS

| | | | | |
|---|---|---|---|---|
| 1,196,455 A | | 8/1916 | Hesse | |
| 3,645,286 A | * | 2/1972 | Follett | F16K 17/28 137/460 |
| 3,921,662 A | * | 11/1975 | Hauffe | F16K 17/285 137/515 |
| 4,562,852 A | * | 1/1986 | Britt | F16K 1/305 137/329.3 |
| 4,606,367 A | * | 8/1986 | Britt | F16K 1/14 137/15.12 |
| 4,635,680 A | * | 1/1987 | Fang | F16K 1/305 137/519.5 |
| 4,745,940 A | * | 5/1988 | Ely | F16K 17/366 137/39 |
| 4,907,617 A | * | 3/1990 | Whalen | F16K 17/406 137/68.11 |

(Continued)

*Primary Examiner* — Umashankar Venkatesan
(74) *Attorney, Agent, or Firm* — Kenneth H. Jack; Davis & Jack, L.L.C.

(57) ABSTRACT

A pressurized gas vessel port assembly incorporating a wall; a port extending through the wall; a nipple extending inwardly from the wall and having a hollow bore communicating with the port; a plug received within the hollow bore for movement between first and second positions, the plug residing at an inner end of the nipple at the first position and being displaced outwardly from the first position upon movement toward the second position; a venturi port opening the first nipple's hollow bore, the venturi being positioned outwardly from the first position for inducing an outward flow of the gas within the hollow bore; and incorporating a seat which outwardly overlies the venturi port, the seat being fitted for, upon a completion of the outward movement of the plug toward the second position, annularly contacting the plug and staunching the outward gas flow.

5 Claims, 12 Drawing Sheets

(56) References Cited

U.S. PATENT DOCUMENTS

| | | | | | |
|---|---|---|---|---|---|
| 5,022,423 | A * | 6/1991 | Britt | F16K 17/40 137/329.3 |
| 5,144,973 | A * | 9/1992 | Green | F16K 17/40 137/513.3 |
| 5,894,859 | A * | 4/1999 | Pavlicek | F16K 17/285 137/460 |
| 2014/0318651 | A1 | 10/2014 | Harris | |

* cited by examiner

PRESSURIZED GAS VESSEL PORT ASSEMBLY

FIELD OF THE INVENTION

This invention relates to vessels, tanks, and bottles which are adapted for storing and dispensing pressurized gas such as oxygen or acetylene. More particularly, this invention relates to safety assemblies which are mechanically associated with such vessels for preventing catastrophic releases of pressurized gases.

BACKGROUND OF THE INVENTION

High pressure rated vessels such as oxygen bottles and acetylene bottles commonly comprise a hermetically walled chamber which is capable of storing and allowing controlled dispensation of a volume of the pressurized gas. The walls of such vessels commonly form a nipple which mounts a stop cock or on/off valve. A violent impinging contact against a pressure vessel's stop cock valves, such as an accidental contact with a floor upon mishandling and dropping of the vessel, may break the valve at its attachment neck or may tear the valve away from its threaded mount within the vessel's nipple. Upon such accidental valve breakage, a violent emission of the pressurized gas may commence, causing the nipple to forcefully emit the gas in the manner of a rocket nozzle. Such accidental violent gas emission may undesirably propel the vessel through spaces occupied by persons or valuable property, causing injury, death, and property damage.

The instant inventive pressurized gas vessel port assembly solves or ameliorates the problems and challenges discussed above by providing a specially adapted inwardly extending nipple including and supporting a slidably mounted plug element which instantaneously mechanically reacts to a gas pressure release event of the type described above to staunch the flow of the gas.

BRIEF SUMMARY OF THE INVENTION

A first structural component of the instant inventive assembly comprises a section or portion of a wall of a pressurized gas vessel, such wall section having a high pressure inner side, and having a relatively low pressure outer side. In a preferred embodiment, the vessel wall section component is positioned at the vessel's upper end, and includes specialized mechanical features which are described and discussed below.

A further structural component of the instant inventive assembly comprises a port or through channel which completely traverses the vessel wall section component from its inner end to its outer end.

A further structural component of the instant inventive assembly comprises a first nipple which has a hollow bore. The first nipple necessarily extends inwardly from the vessel wall, and the first nipple is preferably positioned so that its hollow bore communicates with the port component.

A further structural component of the instant inventive assembly comprises a plug which is slidably and/or rollably mounted and received within the hollow bore of the first nipple. In the preferred embodiment, the plug component is spherical and is movable between first and second positions. At the first position, the plug rests at an inner end of the first nipple and, upon movement of the plug to the second position, the plug displaces outwardly from the first position to seal against an outwardly overlying reduced diameter annular surface. In a preferred embodiment, the plug is normally negatively buoyant within the compressed gas environment of the vessel, and is biased downwardly by gravity against a slide stop which may partially occlude the first nipple's lower or inner opening.

A further structural component of the instant inventive vessel wall port assembly comprises at least a first venturi which is preferably connected operatively to or is formed wholly with the first nipple's side wall. In a preferred embodiment, the at least first venturi comprises at least a first aspiration port which is adapted for, upon an exposure of the outer end of the port to a low pressure environment (e.g., atmospheric pressure), inducing an outward flow of gas within the first nipple's hollow bore. In the preferred embodiment, such venturi is positioned to underlie the vessel wall and to outwardly overlie the plug's slide stopped first position.

The reduced diameter annular surface component of the instant inventive assembly preferably comprises a valve seat which is fitted for hermetically sealing against an outer end of the plug component. In the preferred embodiment, such seat component is operatively positioned to underlie the outer opening of the port, and to overlie the at least first venturi, such positioning allowing the plug to pass outwardly beyond the venturi without allowing any outward passage of the plug from the port.

In operation of the instant inventive pressurized gas vessel port assembly, a stop cock valve which is threadedly mounted to an outer end of the port may accidentally come into striking contact with a floor surface or other object. Such contact may break the valve or may tear the valve away from its threaded vessel port mounting, resulting in an immediate forceful outward emission of gas. The onset of such accidental gas flow substantially instantaneously actuates the invention's venturi component to induce a pressure differentiating flow of the gas within the hollow bore of the inwardly extending nipple. Such pressure differentiating flow advantageously causes the plug component to buoyantly rise within the nipple bore, and to move toward its second position. Hermetic annular sealing contact of the plug with the seat component is quickly established at the plug's second position within the hollow nipple bore. Accordingly, upon such accidental stop cock valve breakage, the instant inventive assembly substantially immediately terminates and prevents the forceful emission of the gas.

In a useful alternative embodiment, the inventive assembly incorporates modular and interchangeable components which are commonly useable with multiple gas vessels having similar outwardly extending nipples, such alternative embodiment functionally incorporating a second outwardly extending nipple which is concentrically segmented. In such alternative embodiment, the first nipple suspends from a concentric radially underlying segment of the second nipple.

Accordingly, objects of the instant invention include the provision of a pressure tank port assembly which incorporates structures, as described above, and which arranges those structures in relation to each other in manners described above, for the performance and achievement of the beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENTS

Figure 1:
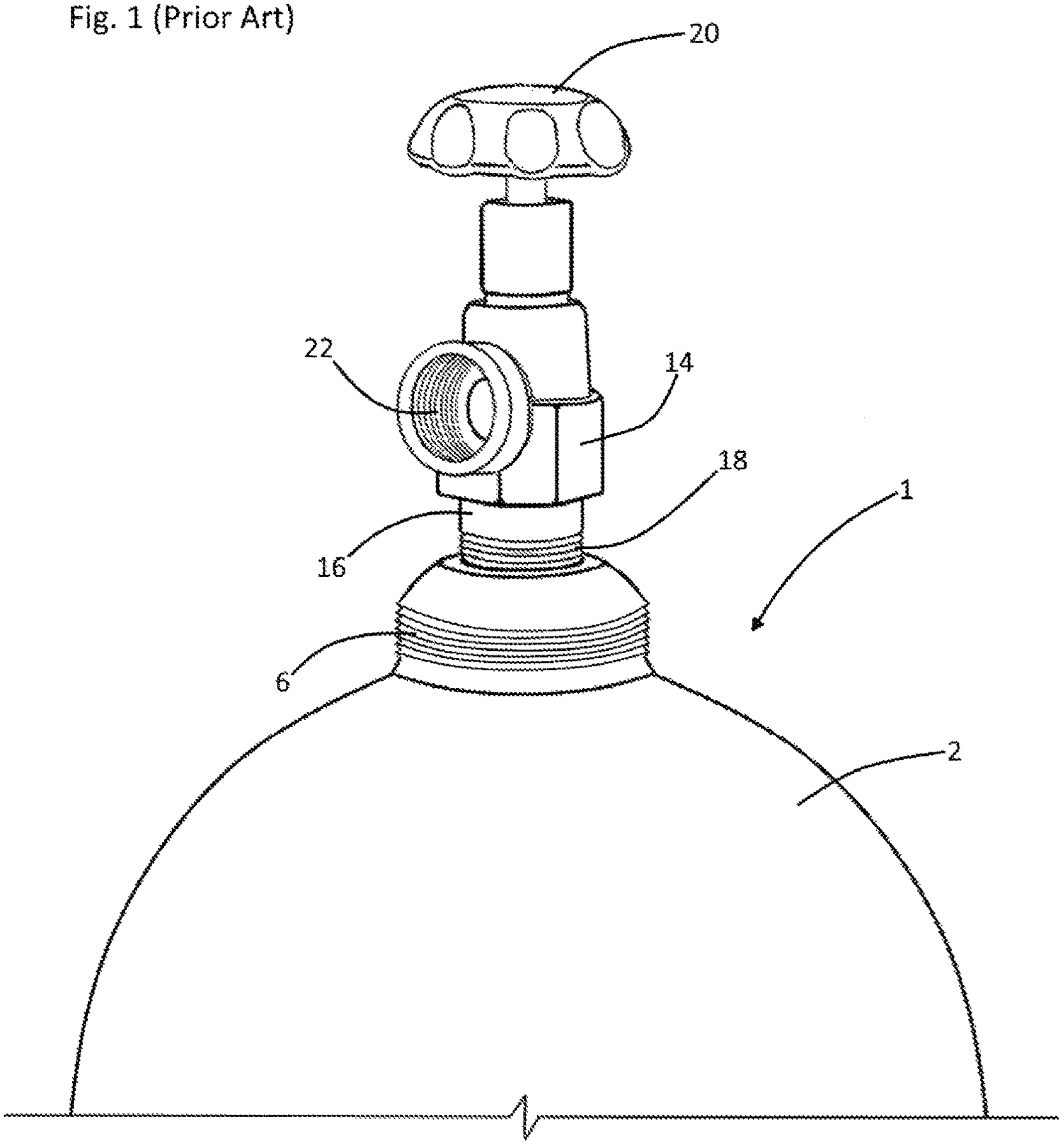
Fig. 1 (Prior Art)
FIG. 1 is a partial view of a prior art pressure tank and stop cock valve assembly.
Figure 2:
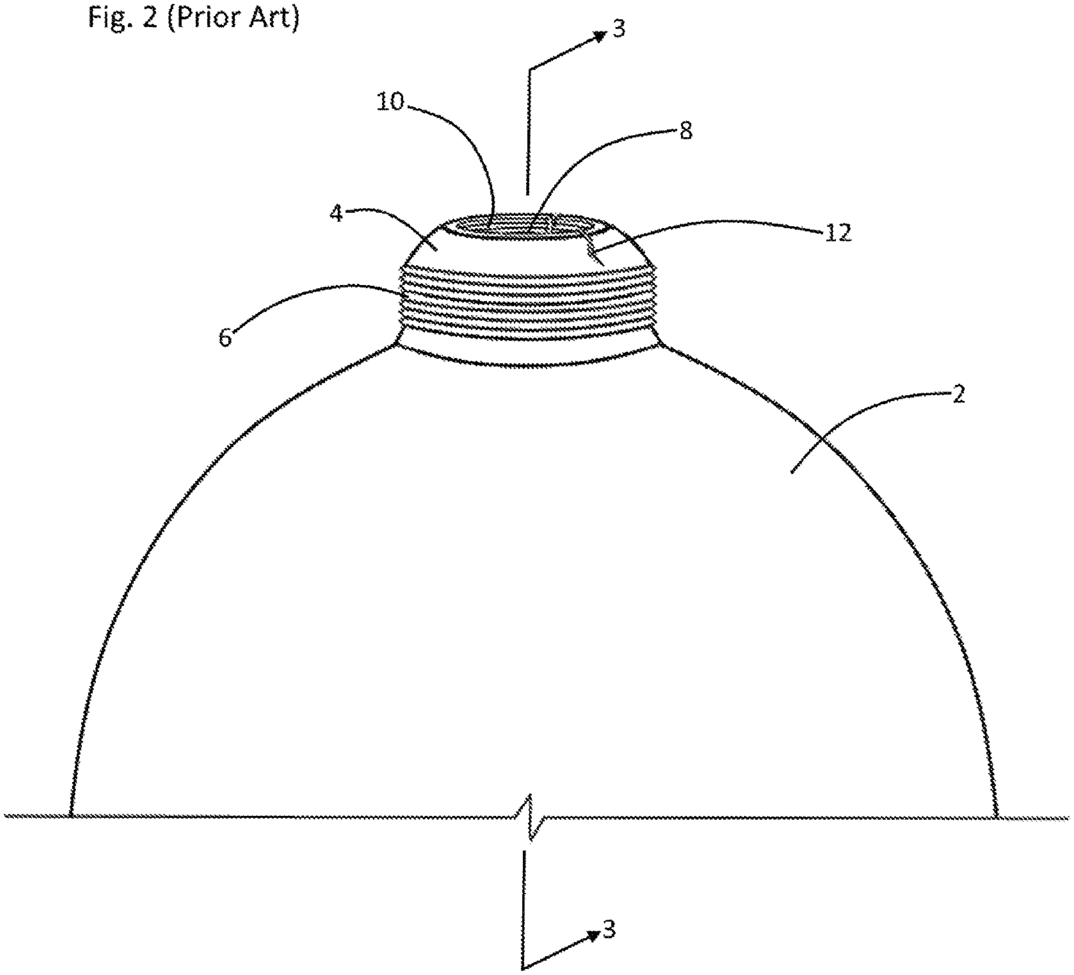
Fig. 2 (Prior Art)
FIG. 2 redepicts the structure of FIG. 1, the view of FIG. 2 showing the stop cock valve component broken away.
Figure 3:
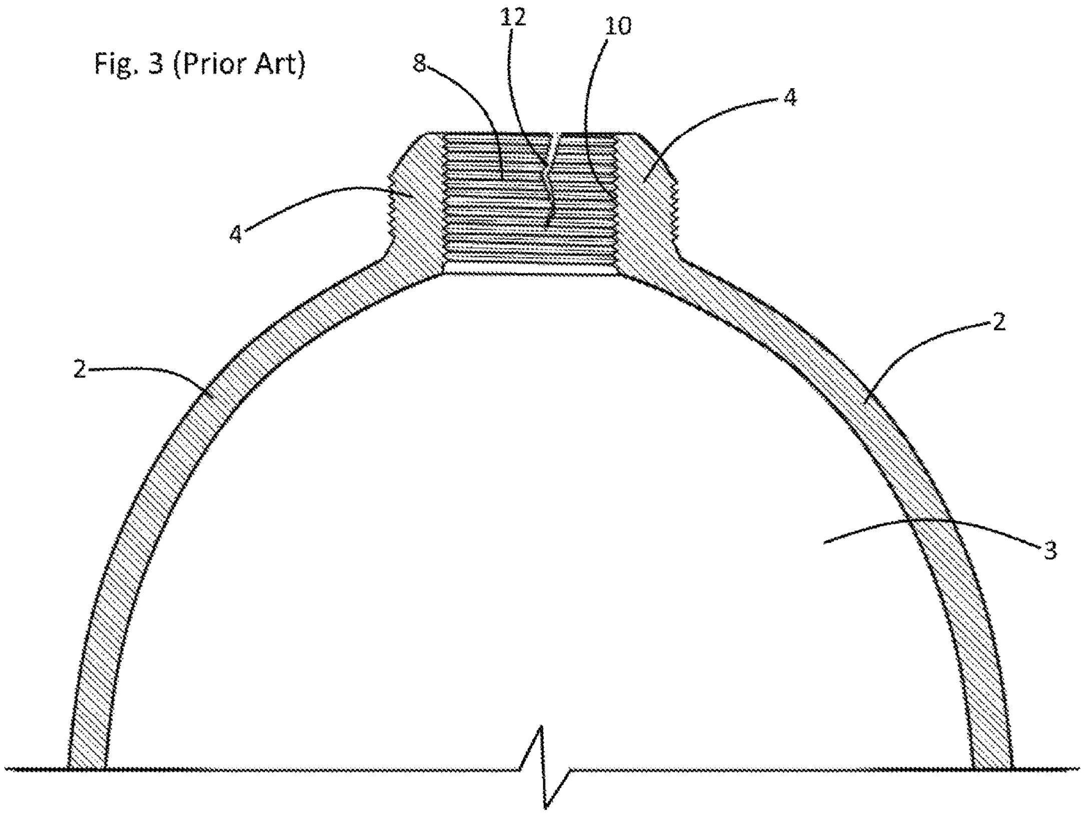
Fig. 3 (Prior Art)
FIG. 3 is a sectional view as indicated in FIG. 2.

Referring now to the drawings, and in particular to Drawing FIGS. 1-3, a prior art pressurized gas vessel having an installed on/off valve or stop cock valve 14 is referred to generally by Reference Arrow 1. Such pressure vessel has an upper wall section 2, and such wall section and the vessel's remaining enclosure hermetically seals and closes a gas containing interior space 3. A port 8 having interior or female helical threads 10 extends through the wall section 2 from its high pressure inner side to its lower pressure outer side. Such port 8 is commonly surrounded by and comprises a hollow bore of an outwardly extending nipple 4 which provides structural rigidity to and reinforcement of the port 8, and provides a vertically lengthened span of the helical threads 10 for secure valve attachment.

The on/off or stop cock valve 14 has a tubular base end 16 which presents exterior or male helical threads 18 fitted for engagement with and mounting upon the female threads 10 of the outwardly extending nipple 4, such valve 14 having an outlet port 22 and an actuator knob 20. Helical threads 6 about the annular outer surface of the nipple 4 facilitate threaded mounting of a protective cap (not depicted within views).

Pressurized gas vessels such as the prior art tank 1 may, as a result of mishandling, fall from a raised surface such as a loading dock platform. Such vessels also may become damaged by a vehicle collision experienced during carriage of the vessel upon a truck cargo bed. Such accidental events may, upon occasion, direct extreme lateral forces against the stop cock 14, causing it to fracture or tear away from its threaded socket mount 8,10 within nipple 4, resulting in damage 12 to the nipple 4. Such accidental damage to the stop cock 14 and/or nipple socket 8,10 may cause an immediate violent release of the pressurized gas from the vessel. Upon such accidental gas release, the nipple 4 may undesirably function in the manner of a rocket nozzle, potentially accelerating the entire tank through spaces occupied by persons or valuable property. Such vessel rocketing effect is potentially fatal, and the instant invention's primary purpose and objective is to lessen the risk of damage, injury, and death resulting from such pressurized gas vessel accidents.

Figure 4:
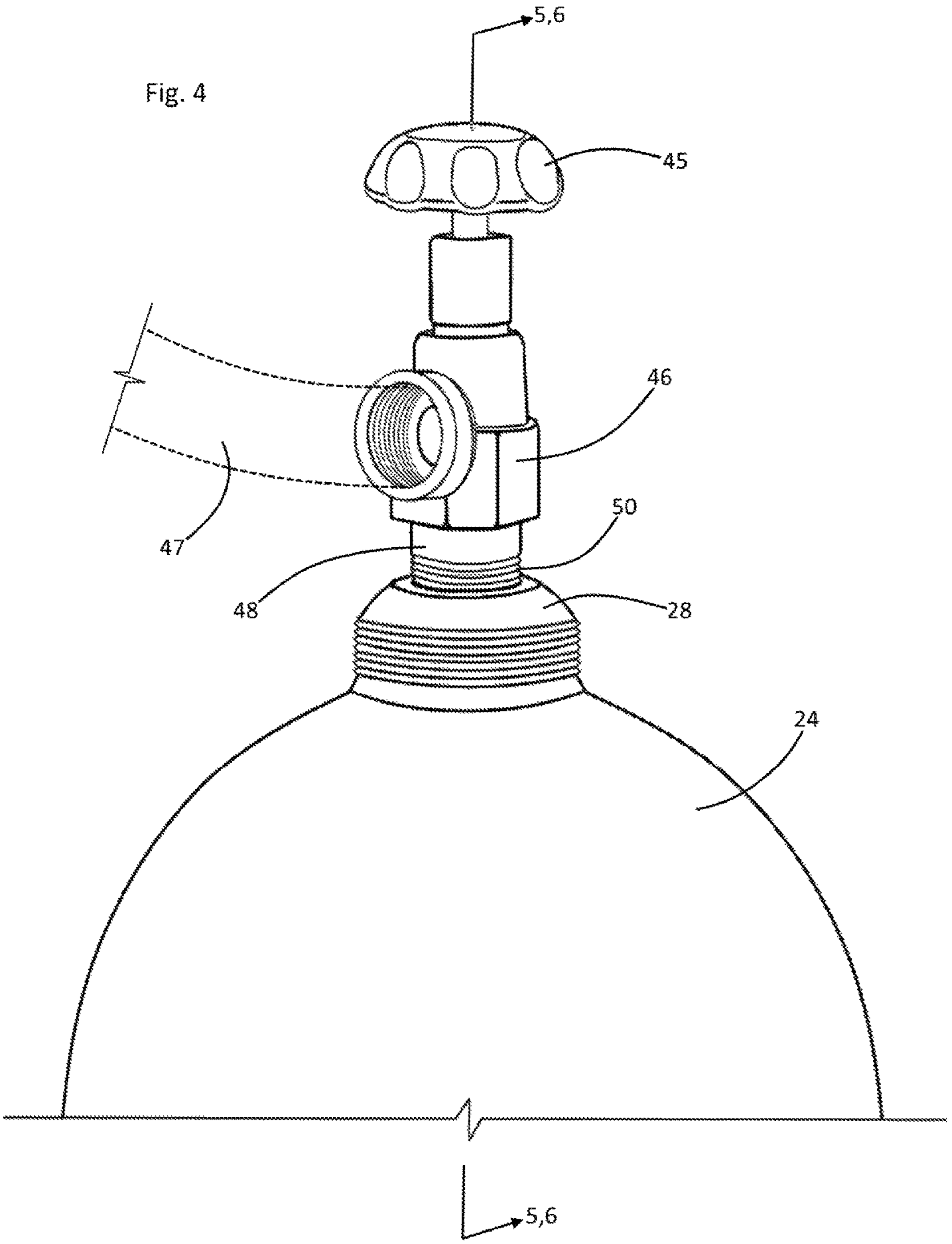
FIG. 4 is a perspective view of an embodiment of the instant inventive pressurized gas vessel port assembly.
Figure 5:
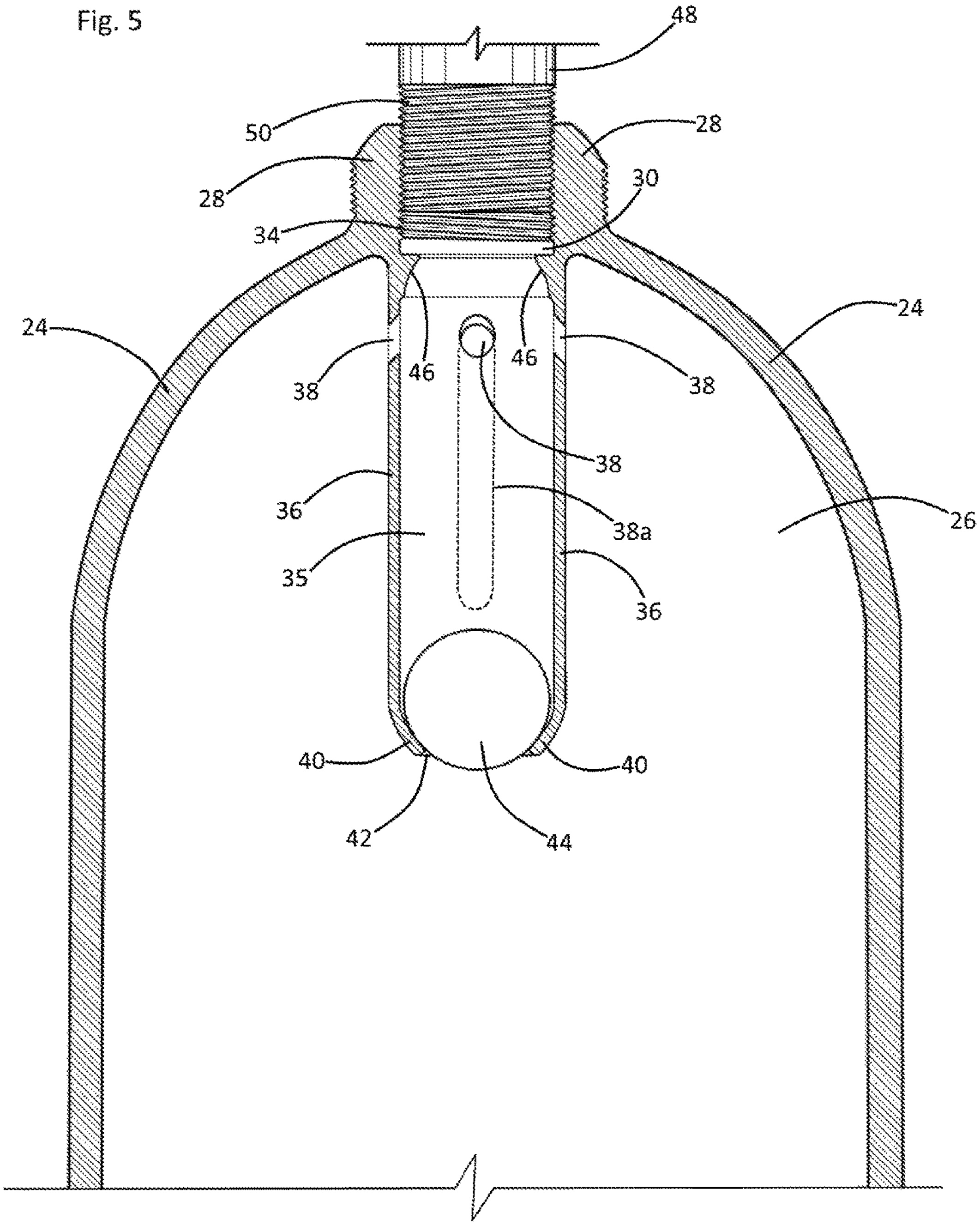
FIG. 5 is a sectional view as indicated in FIG. 4.

Referring simultaneously to FIGS. 4 and 5, an upper pressure vessel wall section 24 has an outlet port 30 which extends from the high pressure inner surface of wall 24 to such wall's outer surface. A tubular first nipple 36 is fixedly attached to or formed wholly with the tank wall 24, and a hollow bore 35 of the first nipple 36 is preferably positioned in alignment and communication with the hollow bore of port 30. In the preferred embodiment, such nipple attachment or whole formation extends annularly about the lower or inner lip of the port 30.

A movable plug 44 is preferably slidably received within the hollow bore 35 of the inwardly extending first nipple 36, and a slide stop 40 is preferably positioned at the extreme inner end of the nipple 36 for retaining the plug 44 within the hollow interior 35, and for resisting any inward movement of the plug 44 beyond the lower or inner end of the nipple 36. In the preferred embodiment, such slide stop 40 is annularly configured and forms and defines a restricted diameter downwardly opening back pressure relieving port 42.

A on/off or stop cock valve 46 having a tubular base end 48 is threadedly mounted by male threads 50 upon female threads 34 which radially inwardly define the outer end of port 30. In normal operation of the instant invention, knob 45 may be turned counter-clockwise to open the valve 46 and to emit a moderate flow of pressurized gas such as oxygen or acetylene into an output line 47. During such normal outward flow, the gas travels from the interior space 26 of the vessel into the interior 35 of the nipple 36 via an at least a first venturi port or gas aspiration port 38. Such normal gas flow is directed outwardly toward port 30, resulting in a relatively small pressure differential between the inner surface of the plug 44 which is exposed over port 42, and the upper surfaces of such plug. Calibrated weighting of the plug 44 assures that negative buoyancy of the plug is maintained during such normal gas flow, and during negative buoyancy conditions, the plug 44 advantageously remains at its normal inward and slide stopped first position.

Figure 6:
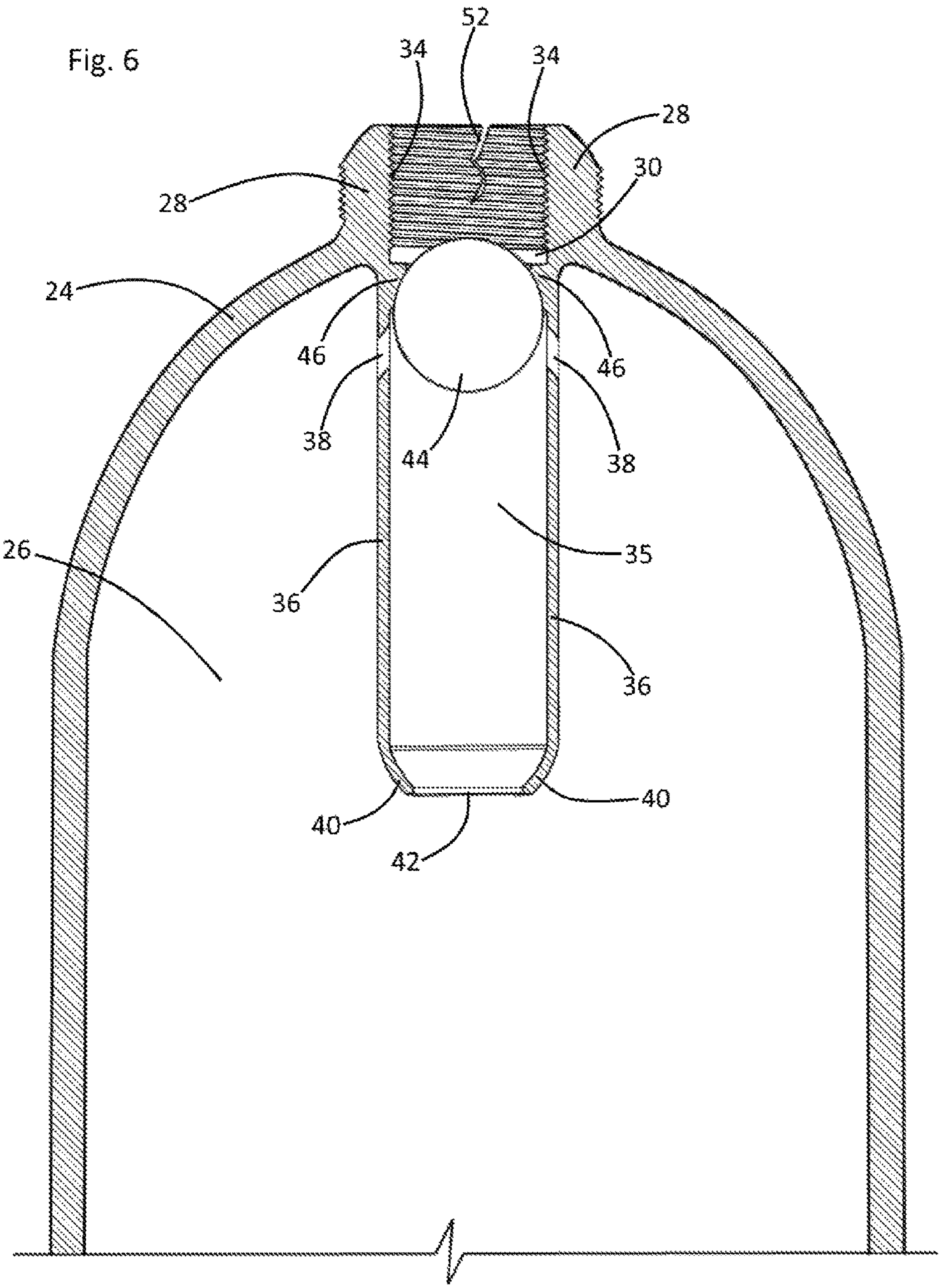
FIG. 6 redepicts the structure of FIG. 5, the view of FIG. 6 showing a plug element alternatively positioned.
Figure 7:
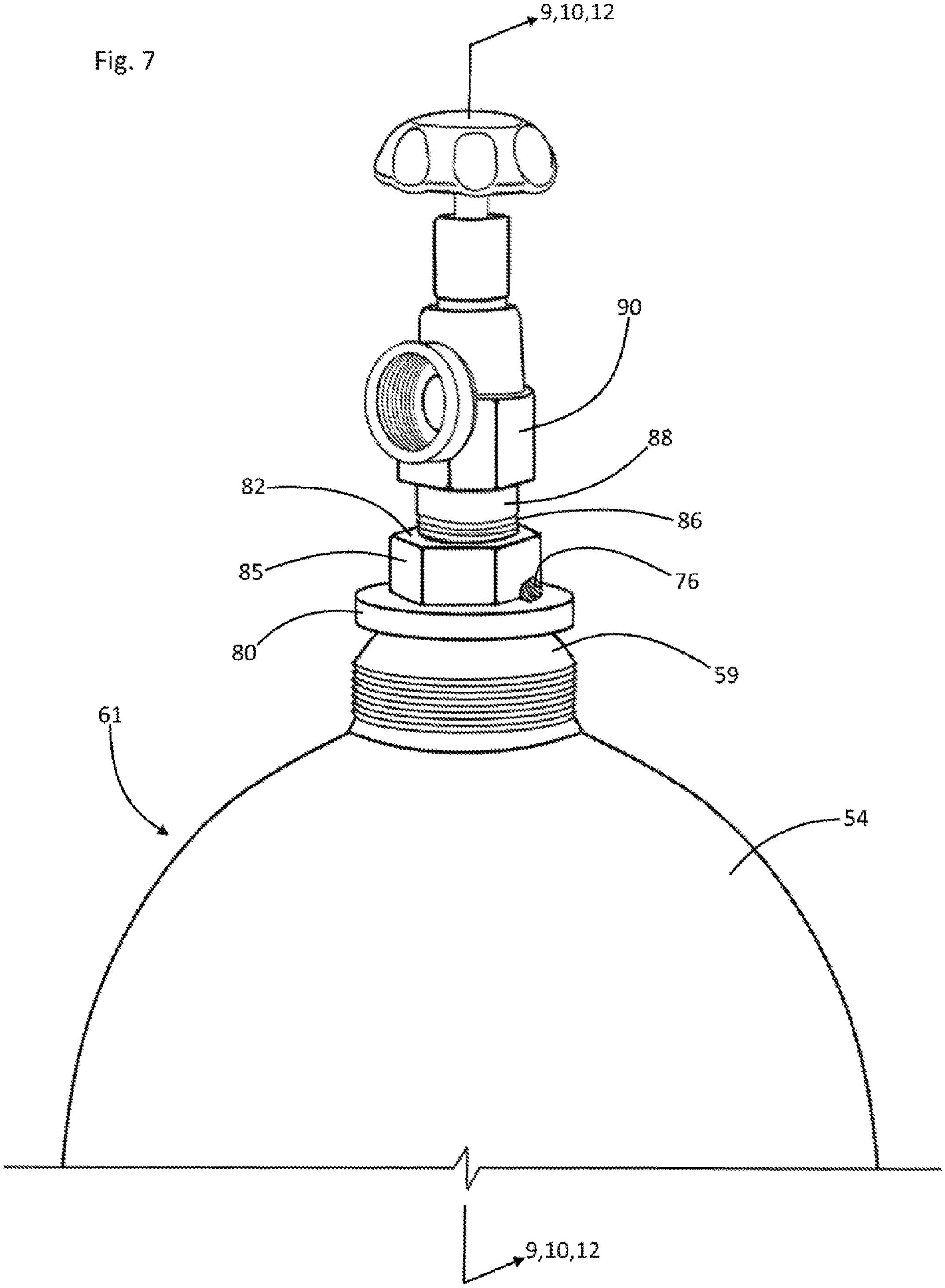
FIG. 7 is a perspective view of an alternative embodiment of the instant inventive pressurized gas vessel port assembly.
Figure 8:
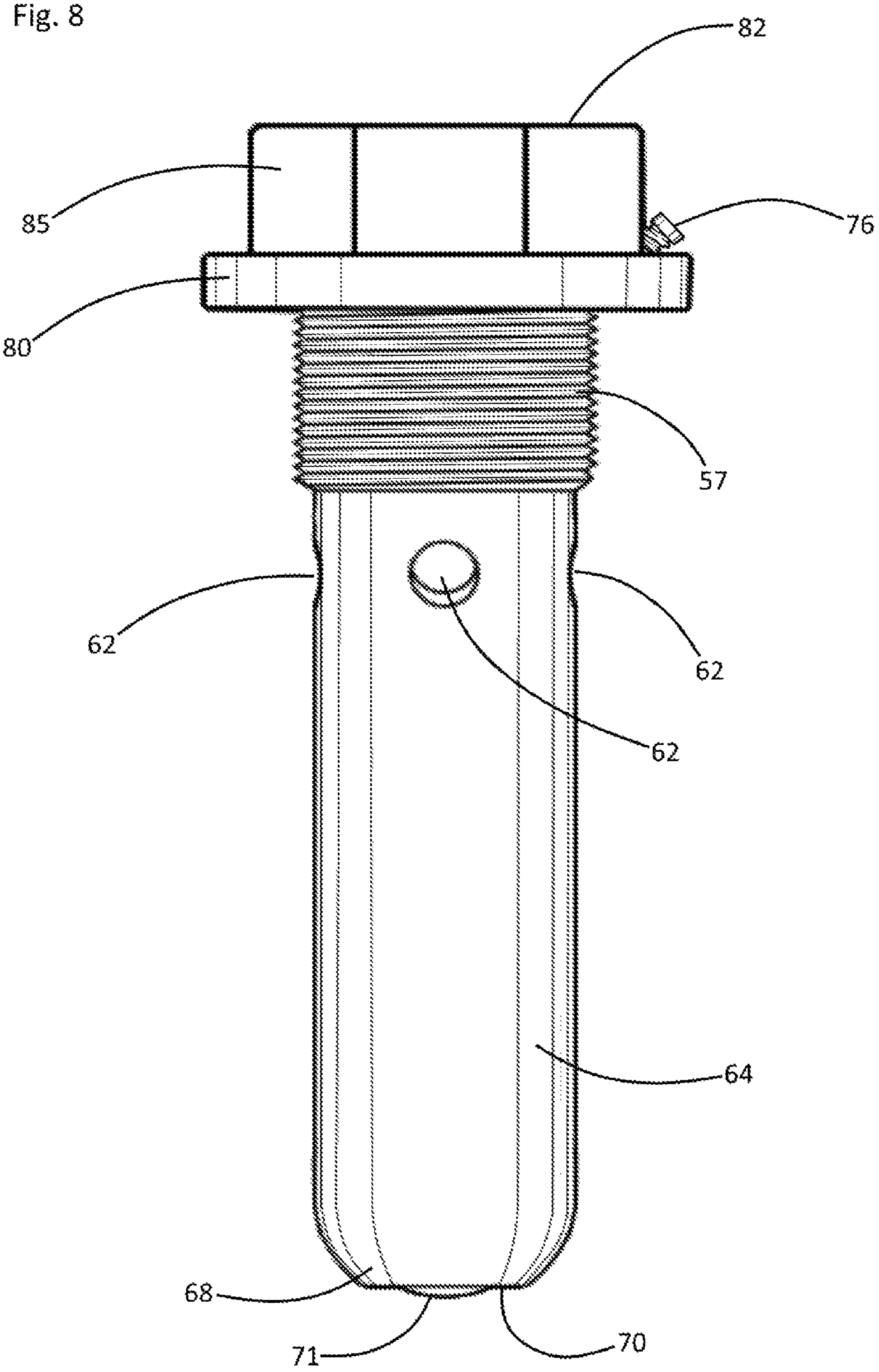
FIG. 8 presents a disassembled component of the assembly of FIG. 7.
Figure 9:
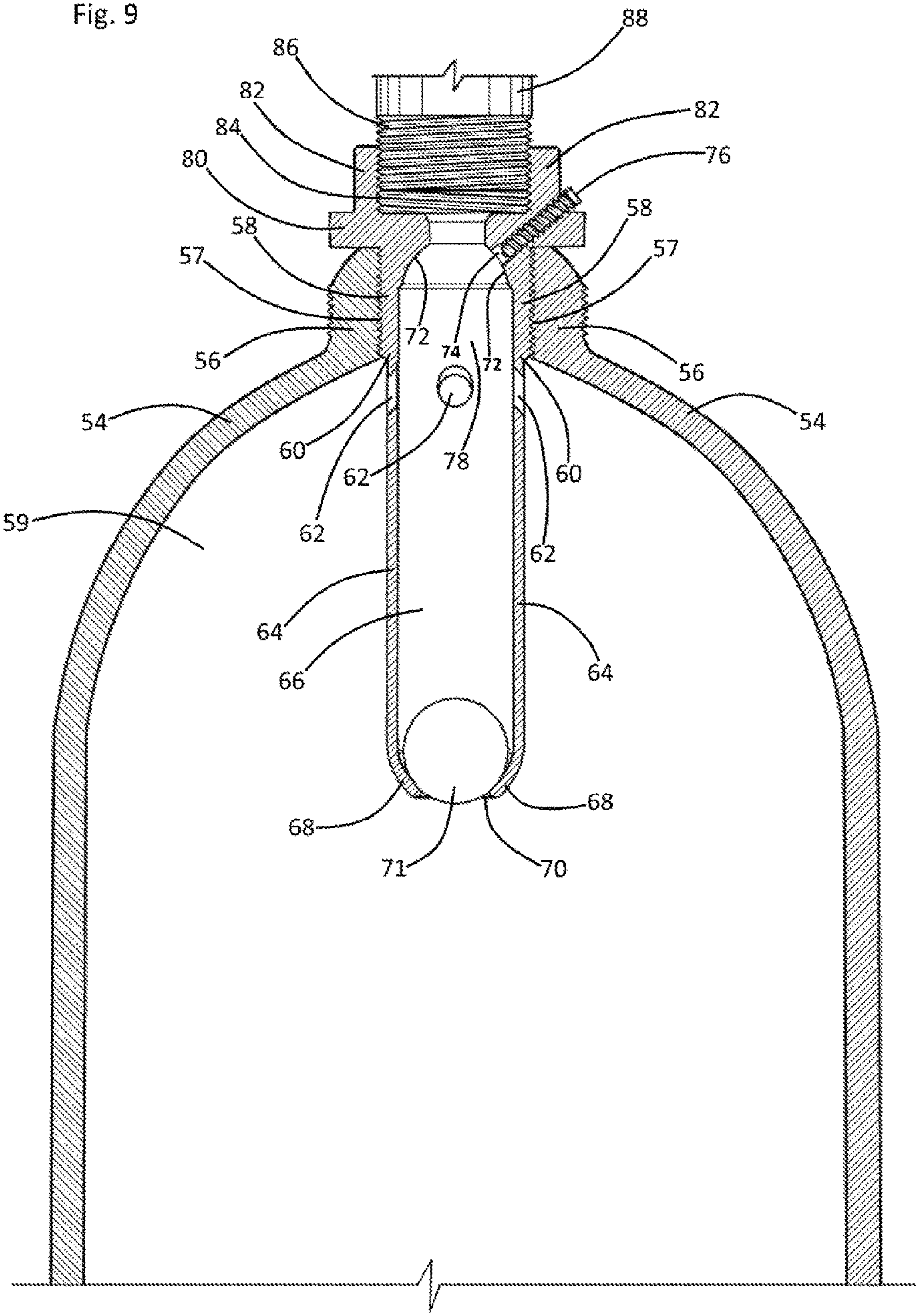
FIG. 9 is a sectional view as indicated in FIG. 7.

FIG. 6 shows the stop cock valve 46 accidentally broken away and shows resultant damage 52 to the threads 34 of a second outwardly extending nipple component 28. Upon such accidental breakage, gas flow from the vessel's interior 26 through the venturi ports 38, instantaneously increases to a level markedly greater than that which is experienced during normal usage and normal gas output flow. Such increased gas flow increases the pressure differential between the inner surfaces of plug 44 exposed within port 42 and the upper surfaces of such plug, causing the plug 44 to buoyantly rise away from its first position within the hollow nipple bore 35. Upon commencement of such buoyant rising of the plug 44 toward its second position, the plug typically outwardly accelerates until it contacts and annularly nests against a convexly fitted annular seat 46. In the preferred embodiment, such seat 46 is positioned above or outwardly from the gas aspirating venturi 38, and inwardly from the extreme outer end of the port 30.

In the preferred embodiment, the plug 44 has a weight which is marginally greater than that which is necessary to maintain negative buoyancy within a maximum gas pressure environment and during a maximum normal rate of gas flow. Upon the selection and incorporation of a plug having such calibrated weight, the increased gas flow resulting from a valve breakage event will always markedly exceed such normal gas flow, guaranteeing an onset of positive buoyancy for seating the plug and staunching the gas flow.

In the preferred embodiment, a plurality of gas aspirating second venturi ports 38 are additionally circumferentially arrayed about the annular periphery of the inwardly extending nipple 36. As an alternative means of adjusting and calibrating the plug raising venturi force produced by ports

38 during normal gas flow, one or more of the venturis may be advantageously vertically oblongated as indicated by the dashed line venturi 38*a* drawn upon FIG. 5. Such vertical venturi oblongation may advantageously allow a durable and relatively light plastic plug 44 to maintain negative buoyancy during normal gas flow levels. Adjustments to the diameter of the plug in relation to the diameter of the nipple and/or adjustments to the length of the nipple represent further alternative means for maintaining an appropriately low venturi force during normal gas flow.

The spherically drawn plug component 44 is representative of other cylindrically shaped plugs having a convex upper or outer ends. Notwithstanding, the depicted spherical plug 44 is preferred because such plug shape advantageously allows the plug to rollably move under the force of gravity toward its seated second position upon an accidental upsetting of the tank, such rolling motion being independent of buoyancy/venturi propulsion.

Referring simultaneously to FIGS. 7-12, an advantageous alternative embodiment of the instant inventive pressurized gas vessel port assembly is presented. In the FIGS. 7-12 embodiment, the outwardly extending second nipple component 59 forms and defines a port 78 which extends through wall 54 of a pressure vessel 61. Such ported outwardly extending second nipple 59 is preferably concentrically segmented to include a radially overlying segment 56 and a radially underlying segment 58. Helical threads 57 are preferably provided at the annular joint between the concentric nipple segments 56 and 58, such threads advantageously allowing screw turning of the radially underlying segment 58 to assemble and disassemble the second nipple 59.

In the FIGS. 7-12 embodiment, an inwardly extending nipple 64 is configured substantially identically with the inwardly extending nipple 36 of the FIGS. 4-6 embodiment, with the exception that the upper or outer end of nipple 64 is fixedly attached to or formed wholly with the lower or inner end 60 of the radially underlying segment 58 of the second outwardly extending nipple 59. In the preferred embodiment, the outside diameter of the inwardly extending first nipple 64 is less than the inside diameter of the radially overlying segment 56 of the outwardly extending second nipple 59 so that, upon threaded installations and deinstallations of the radially underlying segment 58 into and out of the radially overlying segment 56, such first nipple 64 may freely pass through the hollow bore of radially overlying segment 56.

A helically threaded coupler, preferably in the form of an internally helically threaded socket 82, is preferably fixedly attached to or formed wholly with the outer end of the second nipple's radially underlying segment 58. In the preferred embodiment, such coupler and nipple segment interconnection comprises a wholly formed ring segment 80 whose undersurface advantageously functions as a screw turning installation stop. The socket 82 preferably has exterior wrench jaw lands 85, and has interior helical threads 84 which match, referring to FIG. 3, the nipple threads 10 of a common pressure vessel 1. Male threads 57 extending about concentric nipple segment 58 preferably similarly match such threads 10.

In assembling the FIGS. 7-12 embodiment, the outwardly extending or second nipple component 59 may be structurally completed by initially downwardly or inwardly extending the first nipple 64 concentrically through the radially overlying second nipple segment 56. Thereafter, wrench jaws may be engaged with lands 85 of coupler 82, and a screw threading installation of the radially underlying nipple segment 58 may proceed. Continuation of such screw threading causes the second nipple 64 to occupy the installed position of FIG. 9.

Upon such modular assembly of components, the first nipple 64 suspends inwardly or downwardly from the lower or inner aspect of second nipple 59 in the same manner as the downward extension of FIG. 5's nipple 36 from the inner aspect of that embodiment's second nipple 28. Thereafter, the external helical threads 86 of the base tube 88 of stop cock valve 90 may be mounted within helically threaded socket 82 in the same manner as the threaded valve mount of the prior art FIG. 1 installation, and in the same manner as the threaded mounting of valve 46 within the nipple 28 of the FIGS. 4-6 embodiment.

Following pressurization of the vessel 61, and during normal operation of the FIGS. 7-12 embodiment, plug 71 remains negatively buoyantly biased by gravity to the lower or inner end of nipple 64, and rests upon the outer surface of slide stop 68. Normal rates of radially inward gas flow through venturi ports 62, and thence outwardly along bore 66, maintains such normal negative buoyancy and downward first positioning of the plug 71.

In the event that the valve 90 is damaged or broken away, cracking damage 83 to the threads 84 of the helically threaded socket 82 and opening of nipple 59 may occur. However, such damage typically does not interfere with the flow checking function of the plug 71. Excess gas ejecting flow resulting from such valve damage enhances the venturi effect of the flow into and outwardly through the bore 66. Such enhanced venturi effect induces positive buoyancy which raises the plug 71 within hollow bore 66 to upwardly seal at its second position in contact with the annular seat 72.

Figure 10:
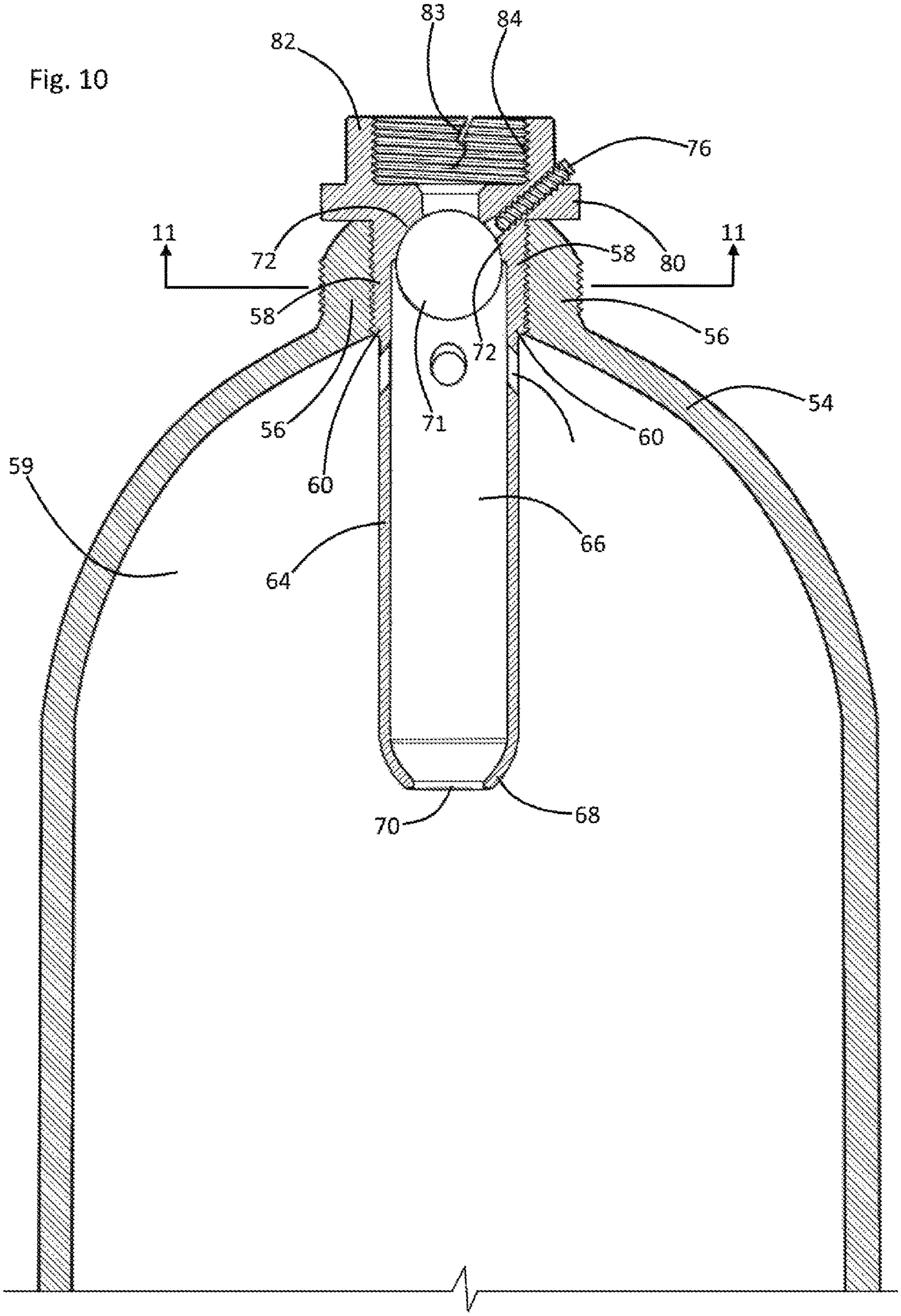
FIG. 10 redepicts the structure of FIG. 9, the view of FIG. 10 showing a plug component alternatively positioned.
Figure 11:
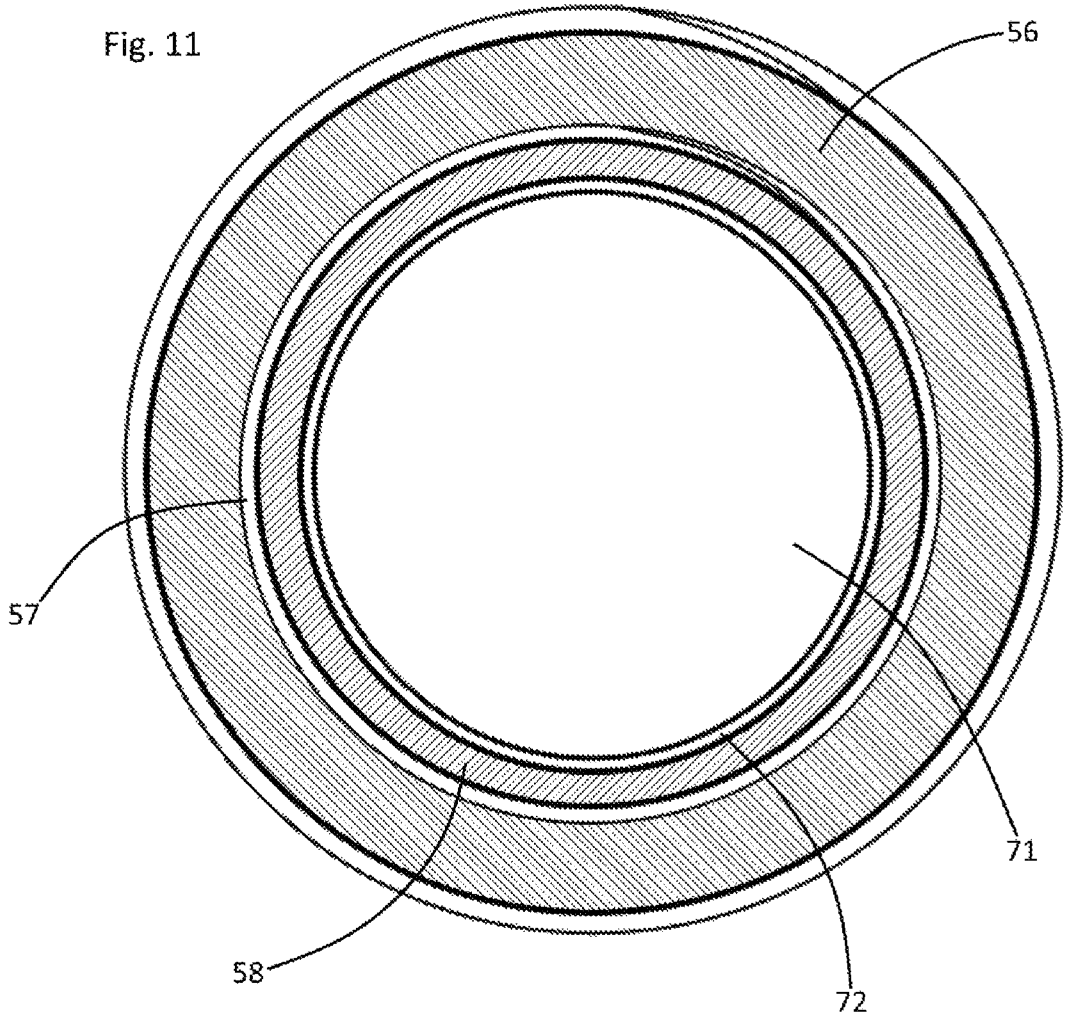
FIG. 11 is a sectional view, as indicated in FIG. 10.
Figure 12:
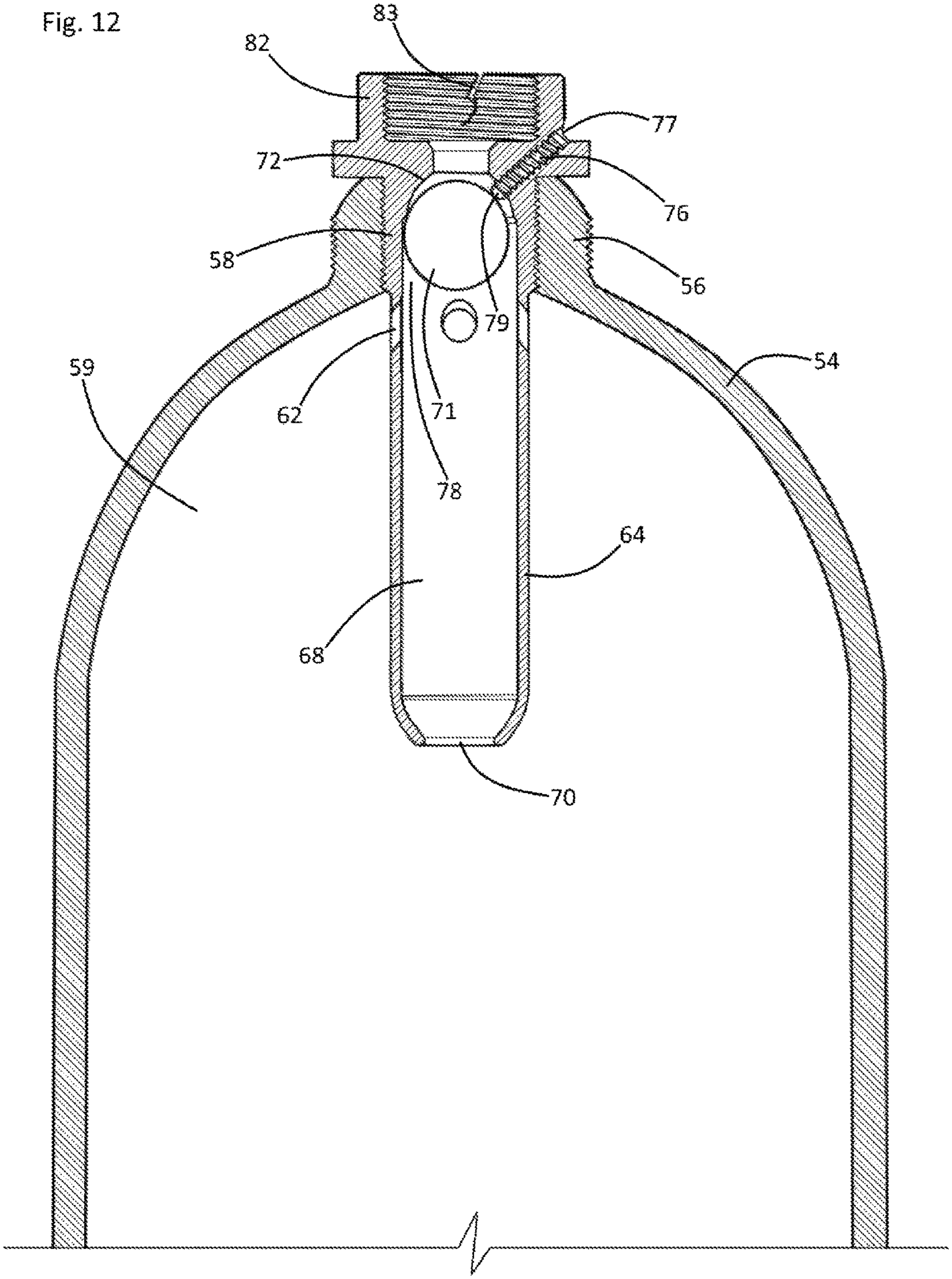
FIG. 12 redepicts the structure of FIG. 10, the view of FIG. 12 showing a plug element alternatively inwardly unseated.

In order to subsequently unseat the gas pressure biased plug 71, and to allow a subsequent controlled release of the pressurized gas, a helically threaded channel 77 and helically threaded plunger 76 combination may be advantageously provided. Such combination's channel 77 preferably opens radially inwardly at the surface of the annular seat 72. The combination's helically threaded plunger 76 may normally reside at the upwardly and radially outwardly retracted position indicated in FIG. 9. Upon plug seating as indicated in FIG. 10, and upon clockwise screw turning of the helically threaded plunger 76, such plunger travels inwardly to bias its inner end 79 against the plug 71, deflecting the plug 71 from its FIG. 10 sealed and seated position to the inwardly deflected and unseated position depicted in FIG. 12. Accordingly, upon screw actuation of the plunger 76, the vessel may be depressurized in a controlled fashion following damage to the valve 90 and following actuation of the plug 71.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A pressurized gas vessel port assembly comprising:

(a) a vessel wall having an inner side and an outer side;

(b) a port extending through the vessel wall, the port having an inner end and an outer end;

(c) a first nipple communicating with the port, the first nipple having a hollow bore and an outside diameter, the first nipple extending inwardly from the port;

(d) a plug moveable between first and second positions within the hollow bore, the plug residing at an inner end of the first nipple upon a movement to the first position, the plug displacing outwardly from the first position upon a movement toward the second position;

(e) a venturi adapted for inducing an outward flow of the gas within the hollow bore, the venturi comprising first and second aspiration ports opening the hollow bore outwardly from the first position;

(f) a seat positioned outwardly from the aspiration ports, the seat being fitted for, upon a movement of the plug to the second position, annularly contacting the plug and stanching the outward gas flow; and (g) a second nipple communicating with and extending outwardly from the port, the second nipple comprising threadedly interconnected concentric segments having inner and outer ends, said segments comprising radially overlying and radially underlying segments, wherein the radially overlying segment has an inside diameter greater than the first nipple's outside diameter, wherein the first nipple's outer end attaches to and aligns with the inner end of the radially underlying segment, wherein the aspiration ports are further positioned inwardly from the inner end of the radially underlying segment; and wherein at least one of the aspiration ports is vertically oblongated.

2. The pressurized gas vessel port assembly of claim 1 further comprising a helically threaded coupler fixedly attached to or formed wholly with the outer end of the second nipple's radially underlying segment.

3. The pressurized gas vessel port assembly of claim 1 wherein the plug is spherical.

4. The pressurized gas vessel port assembly of claim 1 further comprising a slide stop fixedly attached to or formed wholly with the first nipple's inner end, the slide stop being adapted for resisting inward movements of the plug.

5. The pressurized gas vessel port assembly of claim 1 wherein the seat has an annular surface, and further comprising a helically threaded channel and helically threaded plunger combination whose channel opens at said annular surface, said combination being adapted for, upon seating of the plug at the second position, and upon screw turning of said combination's helically threaded plunger, biasing against and inwardly unseating the plug.

* * * * *